(12) United States Patent
Razavi Majomard et al.

(10) Patent No.: US 12,237,982 B2
(45) Date of Patent: Feb. 25, 2025

(54) EARLY DETECTION OF CABLE FAILURE IN AUTOMOTIVE NETWORKS

(71) Applicant: Marvell Asia Pte Ltd, Singapore (SG)

(72) Inventors: Seid Alireza Razavi Majomard, Belmont, CA (US); David Shen, Saratoga, CA (US)

(73) Assignee: Marvell Asia Pte Ltd, Singapore (SG)

( * ) Notice: Subject to any disclaimer, the term of this patent is extended or adjusted under 35 U.S.C. 154(b) by 272 days.

(21) Appl. No.: 17/824,944

(22) Filed: May 26, 2022

(65) Prior Publication Data
US 2022/0385544 A1 Dec. 1, 2022

Related U.S. Application Data

(60) Provisional application No. 63/194,807, filed on May 28, 2021.

(51) Int. Cl.
*H04L 41/149* (2022.01)
*H04L 67/12* (2022.01)

(52) U.S. Cl.
CPC .......... *H04L 41/149* (2022.05); *H04L 67/12* (2013.01)

(58) Field of Classification Search
CPC ....... H04L 41/149; H04L 41/16; H04L 67/12; G06N 3/08; G06N 20/00
See application file for complete search history.

(56) References Cited

U.S. PATENT DOCUMENTS

| | | |
|---|---|---|
| 8,639,468 B2 | 1/2014 | Cloetens |
| 10,554,521 B1 | 2/2020 | Terechko et al. |
| 11,353,517 B1 | 6/2022 | Dewan et al. |
| 2016/0350671 A1* | 12/2016 | Morris, II .......... G05B 23/0229 |
| 2017/0134215 A1* | 5/2017 | Chini .................. H04L 41/0631 |
| 2019/0050515 A1 | 2/2019 | Su et al. |
| 2019/0165921 A1 | 5/2019 | Wu |
| 2019/0215030 A1 | 7/2019 | Nabki et al. |

(Continued)

FOREIGN PATENT DOCUMENTS

| | | |
|---|---|---|
| CN | 112736268 A | 4/2021 |
| WO | 2010013093 A1 | 2/2010 |

(Continued)

OTHER PUBLICATIONS

IEEE Std. 802.3bw-2015, "IEEE Standard for Ethernet—Amendment 1: Physical Layer Specifications and Management Parameters for 100 Mb/s Operation over a Single Balanced Twisted Pair Cable (100BASE-T1)," IEEE Computer Society, pp. 1-88, Oct. 26, 2015.

(Continued)

*Primary Examiner* — Jamal Javaid
(74) *Attorney, Agent, or Firm* — Meitar Patents Ltd.; Daniel Kligler

(57) ABSTRACT

Methods and systems provide for early detection of failures in cables and/or physical layer devices (PHY) linked thereto, of a communications network in a vehicle. The methods and systems employ a computer trained model that analyzes changes in detected values obtained from a given vehicle within an operational time period, against a range of operational values, collected from different vehicles and/or the given vehicle, for the respective PHY parameter, to determine that the cable and/or the PHY linked thereto in the given vehicle may fail within a predetermined time period.

22 Claims, 6 Drawing Sheets

(56) References Cited

U.S. PATENT DOCUMENTS

| | | |
|---|---|---|
| 2019/0279447 A1 | 9/2019 | Ricci |
| 2019/0379589 A1 | 12/2019 | Ryan et al. |
| 2021/0058168 A1 | 2/2021 | Zang |
| 2021/0141011 A1 | 5/2021 | Ben Hassen et al. |
| 2021/0350636 A1* | 11/2021 | Tang ................ G07C 5/085 |
| 2021/0351885 A1 | 11/2021 | Chavva et al. |
| 2021/0366207 A1 | 11/2021 | Seidel et al. |
| 2022/0044495 A1 | 2/2022 | Farjadrad et al. |
| 2022/0092321 A1 | 3/2022 | Keiser et al. |
| 2022/0166461 A1 | 5/2022 | Sun et al. |
| 2023/0041290 A1 | 2/2023 | Cooper |

FOREIGN PATENT DOCUMENTS

| | | |
|---|---|---|
| WO | 2019185657 A1 | 10/2019 |
| WO | 2020160761 A1 | 8/2020 |

OTHER PUBLICATIONS

IEEE Std. 802.3bp-2016, "IEEE Standard for Ethernet—Amendment 4: Physical Layer Specifications and Management Parameters for 1 GB/s Operation over a Single Twisted-Pair Copper Cable," IEEE Computer Society, pp. 1-211, Jun. 30, 2016.
IEEE Std. P802.3cy Draft, "IEEE Standard for Ethernet—Amendment: Physical Layer Specifications and Management Parameters for Greater than 10 GB/s Automotive Electrical Ethernet," IEEE Computer Society, Ethernet Working Group (C/LM/WG802.3), pp. 1-2, Nov. 15, 2019.
EP Application # 21210528.2 Search Report dated May 6, 2022.
Song et al., "Self-Supervised Anomaly Detection for In-Vehicle Network Using Noised Pseudo Normal Data," IEEE Transactions on Vehicular Technology, vol. 70, No. 2, pp. 1098-1108, Feb. 2021.
EP Application # 22176121.6 Search Report dated Nov. 16, 2022.
U.S. Appl. No. 17/396,710 Office Action dated Oct. 12, 2023.
Lei et al., "Applications of Machine Learning to Machine Fault Diagnosis: A Review and Roadmap," Elsevier Ltd., Mechanical Systems and Signal Processing, vol. 138, article No. 106587, pp. 1-39, year 2019.
U.S. Appl. No. 17/396,710 Office Action dated Jan. 25, 2024.
U.S. Appl. No. 17/533,177 Office Action dated Feb. 12, 2024.
U.S. Appl. No. 17/533,177 Office Action dated Mar. 29, 2024.
U.S. Appl. No. 17/396,710 Office Action dated Apr. 18, 2024.
Terven et al., "Loss Functions and Metrics in Deep Learning," A Preprint, arXiv:2307.02694v2, pp. 1-53, Sep. 6, 2023.

* cited by examiner

EARLY DETECTION OF CABLE FAILURE IN AUTOMOTIVE NETWORKS

CROSS-REFERENCE TO RELATED APPLICATIONS

This application claims the benefit of commonly owned U.S. Provisional Patent Application 63/194,807, filed May 28, 2021, entitled: EARLY DETECTION OF CABLE FAILURE IN AUTOMOTIVE NETWORKS, whose disclosure is incorporated herein by reference.

FIELD OF THE DISCLOSURE

The present disclosure relates generally to in-vehicle networks, and particularly to methods and systems for detecting possible cable failures in in-vehicle networks.

BACKGROUND

Modern vehicles, including, in particular, autonomous vehicles, operate while generating very large volumes of data. This data is sensed or otherwise detected, analyzed, and transmitted over the in-vehicle network via physical layer devices (PHYs), cables, and other components.

Over time, cables and/or PHYs may deteriorate, and ultimately fail, due to factors such as aging and mechanical stress on the cables, such as torsion, bending stresses and tension. Also, the exposure to harsh environments, such as large temperature swings, moisture, and other environmental conditions may also accelerate cable and PHY deterioration. Additionally, rodents can also damage cables, by nibbling at the cables. Damaged and/or deteriorating cables and/or PHYs, if left undetected, may result in the in-vehicle network functioning at reduced speeds, functioning incorrectly, or not functioning at all.

Should the damaged cables and/or PHYs fail, or function improperly, the vehicle may become unsafe or inoperative. Repairs are costly. The aforementioned cable and/or PHY failures may also result in other components of the vehicle being damaged, adding to the repair cost. Finally, should a cable or PHY failure occur while the vehicle is operating, the vehicle and its occupants may be catastrophically endangered.

Ascertaining damage to cables or PHYs is a labor intensive process, and requires that the cables or PHYs be accessed and manually examined, or subject to diagnostics. During this time, network links are down, and the vehicle is not moving. Accordingly, when cable damage or degradation is suspected, it is often times simply less expensive to prophylactically replace the cable and/or the PHY, regardless of whether it is actually damaged or not.

The description above is presented as a general overview of related art in this field and should not be construed as an admission that any of the information it contains constitutes prior art against the present patent application.

SUMMARY

The present disclosed subject matter is directed to methods and systems for detecting and/or predicting possible cable failures, including failures of the PHYs linked to each of the cables, for example, for a certain time period. The disclosed subject matter is able to detect possible cable failures from already available data in normal cable and/or PHY links of the in-vehicle network. This also minimizes any hardware and software changes in the in-vehicle network to accommodate the disclosed subject matter, as the disclosed subject matter operates on the presently existing in-vehicle network hardware and software.

The disclosed subject matter increases vehicle safety, as it predicts possible cable and/or PHY failures in advance of the actual cable and/or PHY failures. Additionally, in some cases, the disclosed subject matter is suitable for implementation using artificial intelligence techniques, including using machine learning, which applies models to ascertain cable and/or PHY deterioration and accordingly, determine the possibility of failure, in advance of an actual cable and/or PHY failure.

The disclosed subject matter includes methods, systems, and computer program products, which provide for early detection of failures in cables and/or physical layer devices (PHY) linked thereto, of a communications network in a vehicle, by obtaining values for one or more physical layer device (PHY) parameters from one or more cables and/or a PHY linked thereto, of a communications network of a vehicle; analyzing the obtained values to determine a range of operational values for each of the one or more PHY parameters; detecting values for the one or more of the PHY parameters from a cable and/or the PHY linked thereto of a communications network of a vehicle during an operational time period when the vehicle is operating; and, applying, to the detected values, a computer trained model that analyzes changes in the detected values within the operational time period against the range of operational values, for the respective PHY parameter, to determine that the cable and/or the PHY linked thereto may fail within a predetermined time period.

The disclosed subject matter provides for examination of attributes of cables and/or the PHYs linked thereto, of the in-vehicle network, while the vehicle is in operation (e.g., running with the engine on and/or the vehicle moving, for example, to various locations), to forecast the probability of cable and/or PHY failures, in the future.

In accordance with some implementations, a forecast of future cable degradation, as well as PHY degradation, can be made for days, weeks, months and/or years into the future. It is noted that some future cable and/or linked PHY failures are only detectable during vehicle operation, and cannot be determined by static diagnostics and other tests that are performed while the vehicle is stopped and the requisite cable link is down. Moreover, since, in accordance with implementations described herein, cable degradation can be detected while the vehicle is in operation, down time associated with performing diagnostics and other tests on a stopped, and typically non-running, vehicle, is eliminated.

For example, during vehicle operation, a cable having a loose connection may temporarily or intermittently lose contact with a connector due to road vibrations or jarring. Such intermittent loss of contact would normally not be detected while the vehicle is stopped when the cable is operational. Needless to say, absent road vibrations or jarring that is typical during driving, the intermittent contact may not be disturbed and instead will remain functional at a similar static performance level (Values) as when initially stopped. Consequently, there is no indication as to whether the intermittent cable contact is loose or not.

The disclosed subject matter provides that when a possible existing or forecast failure in the cable and/or PHY linked thereto is determined, an indication of such possible existing or forecast failure is issued to system components, as well as the vehicle operator and/or other parties associated with the vehicle, including parties remote from the vehicle.

The disclosed subject matter is directed to a method for detecting failure in cables and/or physical layer devices (PHY) linked thereto, of a communications network in a vehicle. The method comprises: obtaining values for one or more physical layer device (PHY) parameters, also known as Vehicular Network Operational Parameters (VNOP), from one or more cables and/or a PHY linked thereto, of a communications network of a vehicle; analyzing the obtained values to determine a range of operational values for each of the one or more PHY parameters; detecting values for the one or more of the PHY parameters from a cable and/or the PHY linked thereto of a communications network of a vehicle during an operational time period when the vehicle is operating; applying, to the detected values, a computer trained model that analyzes changes in the detected values within the operational time period against the range of operational values, for the respective PHY parameter, to determine that the cable and/or the PHY linked thereto may fail within a predetermined time period; and, providing an indication, based on detected changes in the values, that the cable and/or the PHY linked thereto may fail within the predetermined time period.

Optionally, the method is such that, the operational values of the range of operational values comprise predetermined acceptable values for performance of the cable and/or the PHY linked thereto, for each of the one or more PHY parameters.

Optionally, the method is such that, the range of operational values for each of the PHY parameters is variable, and is based on the values for the PHY parameters being obtained continuously from the one or more cables and/or the PHY linked thereto.

Optionally, the method is such that, the range of operational values for each of the PHY parameters is based on analyzing a history of the obtained values for each of the PHY parameters from the one or more cables and/or the PHY linked thereto.

Optionally, the method is such that, the computer model analyzes the obtained values to determine the range of operational values for each of the one or more PHY parameters.

Optionally, the method is such that, the PHY parameters include one or more of: return echo signal, signal to noise ratio (SNR), insertion loss, electromagnetic interference, signal power, signal amplitude, signal magnitude, signal frequency, signal phase, signal duration, signal shape, signal polarization, signal modulation, signal level, signal irradiance, clocking, signal power spectrum density, PHY power voltage, PHY current level, PHY temperature, cable noise, cable, cable power transmission, and increased or new echo locations in the cable.

Optionally, the method is such that, the one or more physical layer device (PHY) parameters from one or more cables and/or PHYs linked thereto includes a plurality of PHY parameters, and, the providing the indication that the cable and/or PHY linked thereto may fail is based on the detected values for at least a plurality of the PHY parameters being indicative that the cable and/or PHY linked thereto is failing.

Optionally, the method is such that, the determining that the cable and/or the PHY linked thereto may fail includes the determined values for at least one of the PHY parameters for the operational time period being within the range of operational values and trending toward moving outside of the range of operational values for the one of the PHY parameters.

Optionally, the method is such that, the determining that the cable and/or the PHY linked thereto may fail includes the determined values for at least one of the PHY parameters for the operational time period being within and/or outside of the range of operational values, including, trending toward moving outside of the range of operational values, for the one of the PHY parameters.

Optionally, the method is such that, wherein the computer trained model comprises a rules-based model.

Optionally, the method is such that, the computer trained model comprises an Artificial Intelligence (AI) model or a machine learning (ML) model.

Optionally, the method is such that, the AI or ML model is trained to: identify the detected values in accordance with a corresponding PHY parameter from amongst the one or more PHY parameters; and, distinguish among a plurality of predetermined Physical Layer (PHY) parameters in cables and/or Physical Layer devices (PHYs) linked thereto, in the vehicular communication network, so as to determine whether the cable and/or PHY linked thereto, in the vehicle communication network, may fail within a predetermined time period, by analyzing changes in the detected values, against a range of operational values, for the respective PHY parameter, the range of operational values learned from computer analysis of a multiplicity of previous values corresponding to data, signals, and/or echoes, for the PHY parameter.

Optionally, the method is such that, the AI or ML model is trained to determine whether a plurality of determined values obtained in the operative time period indicates a probability of failure in a predetermined time, of the cable and/or the PHY linked thereto.

Optionally, the method is such that, wherein the computer trained model additionally analyzes the detected values from within the operational time period, and determines whether certain of the one or more PHY parameters are to be determined within another operational time period of a predetermined length.

Optionally, the method is such that, the AI or ML model includes a neural network model.

Optionally, the method is such that, the obtaining values for one or more PHY parameters from the one or more cables and/or the PHY linked thereto, includes obtaining the values from the one or more cables and/or the PHY linked thereto of the vehicle and/or one or more different vehicles.

Optionally, the method is such that, the range of acceptable operational values includes the most recently determined range of acceptable operational values.

The disclosed subject matter is directed to a system for determining failures of cables and/or physical layer devices (PHYs) linked thereto of a vehicular communication network. The failure determination system comprises: one or more processors; and, a program memory. The program memory stores executable instructions that, when executed by the one or more processors, cause the system to: obtain a plurality of values corresponding to data, signals, and/or echoes for a physical layer device (PHY) parameter, the values of the plurality of values corresponding to data, signals, and/or echoes received from a cable and/or PHY linked thereto, of a vehicle communication network of a given vehicle; apply, to the at least the plurality of values, a computer trained model that distinguishes among a plurality of predetermined Physical Layer Device (PHY) parameters in cables and/or Physical Layer devices (PHYs) linked thereto, in the vehicular communication network, so as to determine whether the cable and/or PHY linked thereto, in the vehicle communication network, may fail within a predetermined time period, by analyzing changes in the plurality of values obtained within the operational time period, against a range of operational values, for the respective PHY parameter, the range of operational values learned from computer analysis of a multiplicity of previous values corresponding to data, signals, and/or echoes, for the PHY parameter; and, provide an indication, based on detected changes in the values, that the cable and/or the PHY linked thereto may fail within the predetermined time period.

Optionally, the system is such that the multiplicity of previous values is obtained from cables and/or PHYs linked thereto from: 1) one or more vehicles different from the given vehicle, and/or 2) the given vehicle.

Optionally, the system is such that the range of operational values includes values determined to be acceptable of performance for the cable and/or PHY linked thereto, for the PHY parameter.

Optionally, the system is such that the values determined to be acceptable of performance for the cable and/or PHY linked thereto, for the PHY parameter, are the values most recently determined to be acceptable for performance of a cable and/or a PHY linked thereto, for the PHY parameter.

Optionally, the system is such that the computer trained model is stored in the program memory and comprises at least one of a rules-based model, Artificial Intelligence (AI) model and a machine learning (ML) model.

Optionally, the system is such that the AI or ML model includes a trained neural network.

Optionally, the system is such that the PHY parameters include one or more of: return echo signal, signal to noise ratio (SNR), insertion loss, electromagnetic interference, signal power, signal amplitude, signal magnitude, signal frequency, signal phase, signal duration, signal shape, signal polarization, signal modulation, signal level, signal irradiance, clocking, signal power spectrum density, PHY power voltage, PHY current level, PHY temperature, cable noise, cable, cable power transmission, and increased or new echo locations in the cable.

Optionally, the system is such that it is additionally caused to respond to the indication by one or more of: logging the identified possible failure of the cable and/or PHY linked thereto, issuing an alert, notifying the driver or other user associated with the given vehicle, switching to a backup cable, and stopping the vehicle.

BRIEF DESCRIPTION OF THE DRAWINGS

The present disclosure will be more fully understood from the following detailed description of the embodiments thereof, taken together with the drawings in which.

DETAILED DESCRIPTION OF EMBODIMENTS

Figure 1:
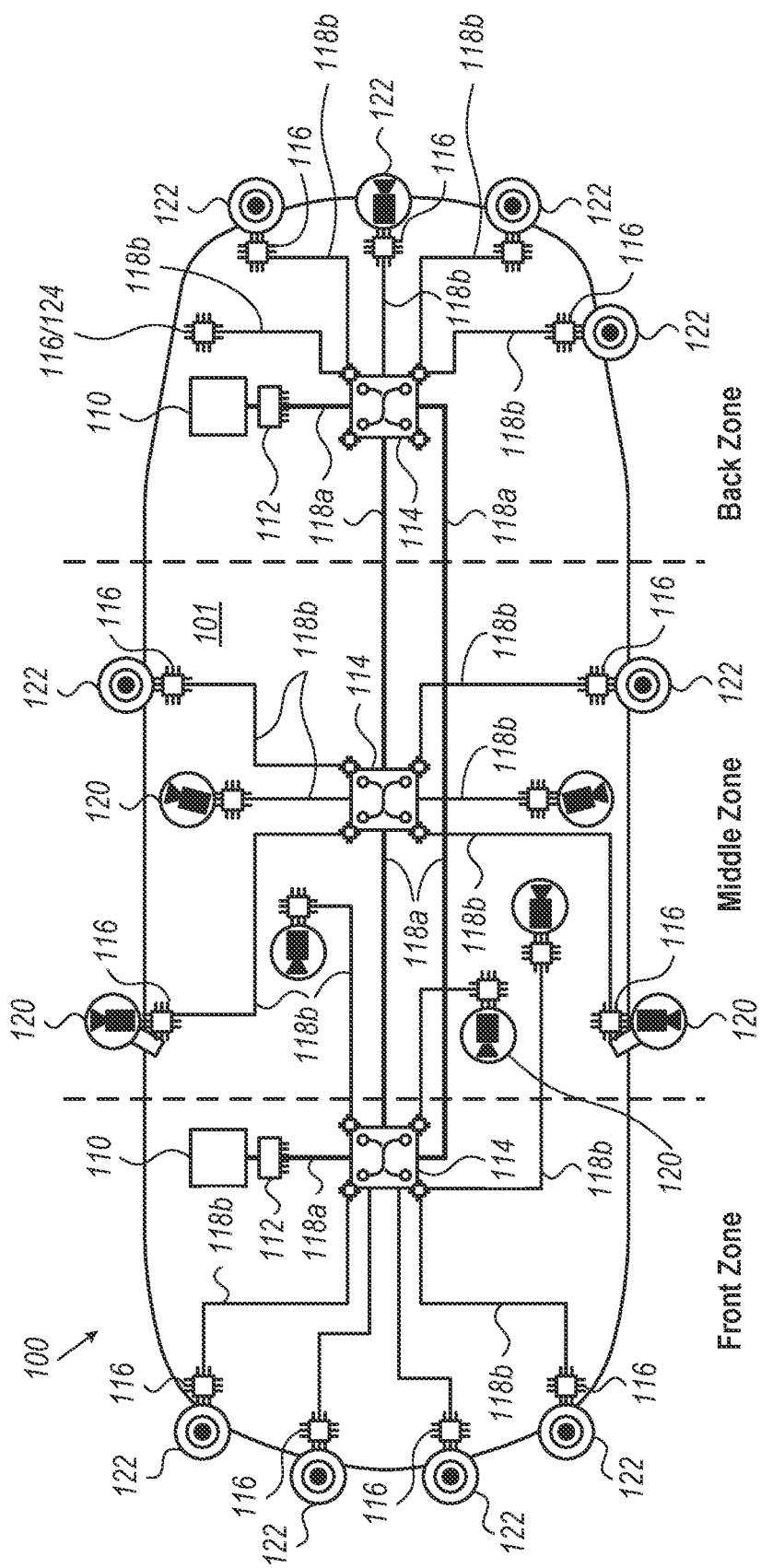
FIG. 1 is a block diagram of an example in-vehicle network (IVN) installed in a vehicle, operating in accordance with an embodiment that is described herein.

FIG. 1 shows a vehicle 100, for example, a motor vehicle, such as an automobile, with an in-vehicle network (IVN) 101, also known as a vehicular communication network, these terms used interchangeably herein. The vehicle 100, may be a standard non-autonomous vehicle, or an autonomous vehicle, classified at any of Society of Automotive Engineers (SAE) Levels, 0 No Automation, 1 Driver Assistance, 2 Partial Automation, 3 Conditional Automation, 4 High Automation, 5 Full Automation. The vehicular communication network includes, for example, integrated circuit (IC) chips for performing various functions. There are also multiple cables, which connect the various components of the vehicular communication network. With this arrangement in the IVN, the disclosed subject matter works on the link and network levels.

The vehicular communication network 101 includes processors 110, for instance, Central Processing Units (CPUs), Graphics Processing Units (GPUs) or other suitable computer processing device, which are representative of a vehicle computer, also known herein as a local computer. The processors 110 communicate with controllers 112 and switches/gateways 114, via physical layer devices (PHYs) 116, over Ethernet links 118a, directly or indirectly.

The switches/gateways 114 communicate with each other via PHYs 116 over Ethernet links 118a, directly or indirectly. The switches/gateways 114 communicate via PHYs 116 with cameras 120, radar/lidar/sonar 122, or other suitable sensors 124, such as temperature sensors, magnetic field sensors, and the like, over Ethernet links 118b, directly or indirectly. Each link 118a, 118b has at least one end connected to a switch 114, via a PHY 116.

The links 118a, 118b comprise, for example, cables, also known as Ethernet cables, for transmission of data and/or for delivering electrical power. The links 118a, 118b are also referred to hereinafter as "cables" or "Ethernet cables", with these terms used interchangeably herein. The cable types may be shielded or unshielded, single stranded or multi-stranded, with the multi-stranded cables being, for example, twisted pair cables, for instance as standardized in one or more of IEEE 802.3bw, 802.3 bp and 802.3cy. The data carrying capacity may not be the same for all cable types. For example, in an embodiment such as is seen in FIG. 1, the Ethernet links 118a support 10/25 Gbps data rates, while the Ethernet links 118b support 2.5/5/10 Gpbs data rates.

Each PHY 116 may include, for example, processors (e.g., chips), circuits, devices, voltage inputs/outputs, boards, such as printed circuit boards (which electronically connect to and support the aforementioned components), and connectors from the boards to the cables 118a, 118b. Also, each PHY 116 links, typically via a suitable Medium Access Control (MAC) device, link partners, such as between an electronic unit and a local computer, i.e., processors 110. The electronic units include, for example, various cameras 120, radar/lidar/sonar 122, or other suitable sensors 124, such as temperature sensors, magnetic field sensors, and the like. The PHYs 116 communicate over cables with local computers, i.e., processors 110, typically via switches 114 and controllers 112.

The configuration of the IVN 101, depicted in FIG. 1, and the composition of network components and/or deployment of the components, such as processors 110, controllers 112, switches 114, PHYs 116, and the various other system elements such as cameras 120, radar/lidar/sonar 122, or other suitable sensors 124, such as temperature sensors, magnetic field sensors, and the like, are example configurations that are depicted solely for the sake of clarity. In alternative embodiments, any other suitable configurations can be used.

The various elements of the IVN 101, e.g., such as processors 110, controllers 112, switches 114, PHYs 116, and other system elements, such as cameras 120, radar/lidar/sonar 122, or other suitable sensors 124, such as temperature sensors, magnetic field sensors, and the like, may be implemented using dedicated hardware or firmware, such as using hard-wired or programmable logic, e.g., in one or more Application-Specific Integrated Circuits (ASIC) and/or one or more Field-Programmable Gate Arrays (FPGA). Additionally or alternatively, some functions of the aforementioned components of the IVN 101, may be implemented in software and/or using a combination of hardware and software elements. Elements that are not mandatory for understanding of the disclosed techniques have been omitted from the figure for the sake of clarity.

In some embodiments, the processors 110 of the internal computer comprise one or more programmable processors, which are programmed in software to carry out the functions described herein. The software may be downloaded to any of the processors in electronic form, over a network, for example, or it may, alternatively or additionally, be provided and/or stored on non-transitory tangible media, such as magnetic, optical, or electronic memory.

Figure 2A:
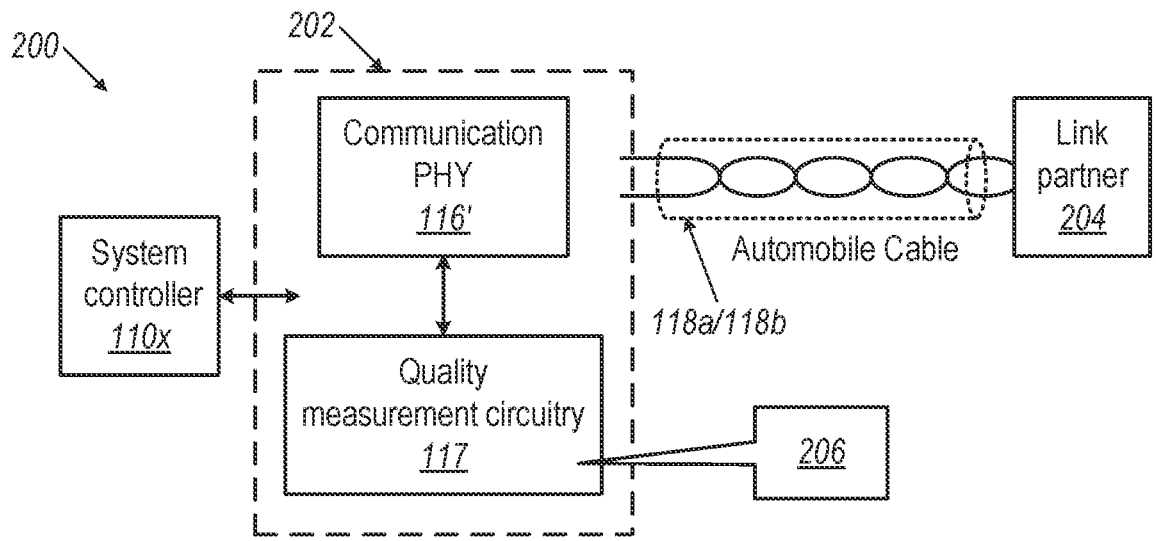
FIG. 2A is a diagram of components of the IVN forming a system to detect and warn of the possibility of future failures in a cable and or the PHY linked thereto of the IVN.
Figure 2B:
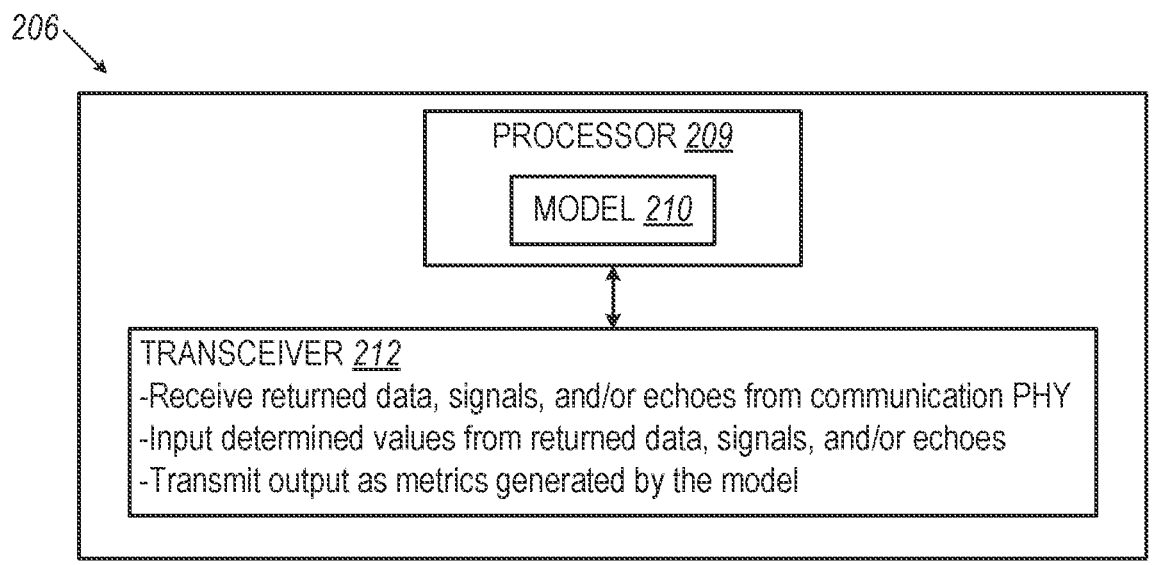
FIG. 2B is a diagram of the insert of FIG. 2A.

Turning now to FIGS. 2A and 2B, there is shown the system 200 of the present disclosure, which includes components of the IVN 101. The system 200 is operable within the IVN 101, and uses many of the existing components of the IVN 101. The system 200, with its components, is positioned at one or more locations of the IVN 101.

The components seen in FIG. 2A include a PHY Unit 202, which includes, for example, a PHY 116' in communication with quality measurement circuitry 117. The PHY Unit 202 communicates with a system controller 110x, which is part of the processor 110, and with a cable 118a, 118b. Each cable 118a, 118b is in communication with a link partner 204. The link partner 204 is, for example, a controller 112, a switch 114, camera 120, radar/lidar/sonar 122, or other suitable sensors 124, such as temperature sensors, magnetic field sensors, and the like. Typically, as shown in FIG. 1, a PHY 116, linked to the cable 118a, 118b, is between and in communication with the cable 118, 118b and the link partner 204. All of the components 110x, PHY Unit 202 (including the communication PHY 116' and the quality measurement circuitry 117), 118a, 118b and the link partner 204 are in communications with each other, directly or indirectly. Each system 200 used in the IVN 101 is linked or otherwise associated with storage media in the IVN 101 or the cloud, to store data used by each system.

The system 200 is such that the PHY Unit 202 is substituted for the PHY 116 and the system controller is added to the processor 110. These modifications and/or augmentations to the IVN 101 allow for determinations of possible failures of a cable 118a, 118b and/or the PHY 116 linked thereto, for example, for a predetermined time period, in the IVN 101.

The PHY Units 202 are, for example, include a PHY 116', also known as a communication PHY, which is similar to the PHYs 116, but modified to communicate with the cable quality measurement circuitry 117 and the system controller 110x. The communication PHY 116' is in communication with quality measurement circuitry 117. The system controller 110x signals or otherwise causes the communication PHY 116' to send signals, data, and the like, of various PHY parameters, also known as Vehicular Network Operational Parameters (VNOP), to the link partner 204, over the cable 118a, 118b, for predetermined time periods, each predetermined time period known as an operational time period. It is during this operational time period that signals, data and echoes, each having and corresponding to a value, known as a determined value (of a measurable unit), are received from the cable and/or the PHY linked thereto, and collected by the communication PHY 116', for analysis by a model of the quality measurement circuitry 117.

The various signals, data, echoes and the like, are received by the communication PHY 116', over each operational time period and having a value of a measurable unit, for example, are known as raw data. This raw data is obtained by the quality measurement circuitry 117, either passed, by being transmitted (e.g., sent) to the quality measurement circuitry 117 by the communication PHY 116', or otherwise pulled by the quality measurement circuitry 117 from the communication PHY 116'. This raw data corresponds to the aforementioned determined values.

The operational time period, over which the determined values are collected or otherwise obtained from the respective cable and or PHY linked thereto of the IVN of the vehicle 100, may be from one or more continuous time periods, occurring over a single time the vehicle is operating (running). The total time may be on the order of seconds, minutes or hours.

The PHY or VNOP parameters, for which the signals, data, echoes and the like, is sent to, and received from, the cable and/or the PHY linked thereto, include, for example, one or more of: return echo signal, signal to noise ratio (SNR), insertion loss, electromagnetic interference, signal power, signal amplitude, signal magnitude, signal frequency, signal phase, signal duration, signal shape, signal polarization, signal modulation, signal level, signal irradiance, clocking, signal power spectrum density, PHY power voltage, PHY current level, PHY temperature, cable noise, cable, cable power transmission, and increased or new echo locations in the cable.

The quality measurement circuitry 117, shown by the insert 206, for example, includes one or more processors 209, which receives a downloaded model 210, for example, a rules-based (non-AI) model or an AI model, including a machine learning (ML) model. The model 210, for example, is a trained model.

The model 210, for example, is either provided and/or establishes, a range of operational values, for example, a range of acceptable operational values. The range of acceptable operational values, is known as such, as the acceptable operational values typically span a range of values considered to be acceptable, in accordance with predetermined performance standards and/or predetermined performance levels, for the cable 118a, 118b and/or PHY 116 linked thereto, for each PHY parameter. The range typically includes ends, boundaries, limits, boarders, and the like, and is subject to change over time, due to accumulated histories of acceptable values for each of the PHY parameters. For example, the range may be such that it includes the most current or present acceptable operational values, which are applied by the model 210. The aforementioned range is applied by the model 210 when it analyzes one or more individual or grouped determined values, collected from the cable 118a/118b and/or the PHY 116 linked thereto, for each respective PHY parameter, to determine possible cable and/or linked PHY failure, for example, within a predetermined time.

The quality measurement circuitry 117 is for example, a computer, computerized device, or the like, and includes one or more processors 209 and memory, similar to the processors 110 detailed above. The quality measurement circuitry 117 is also associated with at least one transceiver 212 to receive signals and data from the communications PHY 116', which were received and/or otherwise returned from the cable and/or associated PHY linked thereto, for example, as raw signals and/or raw data, collectively "raw data", for example, as values (in known measured units), also known as determined values, for each operational time period. The quality measurement circuitry 117 functions, for example, to input the raw data, e.g., values or determined values, for the operational time period into the model 210. The quality measurement circuitry 117 also functions to transmit the model-generated output as metrics to other system 200 computers, processors, components, and the like, and/or, signals, data or the like to the system controller 110x to run additional diagnostics for one or more of the PHY parameters, to further analyze values associated with these PHY parameters, to detect possible failures in cables and/or the PHYs linked thereto.

In the case where additional diagnostics need to be run, the quality measurement circuitry 117, for example, passes raw data the system controller 110x. The system controller 110x interprets this raw data and creates the diagnostic for the raw data, for example, for the raw data for a PHY parameter. The diagnostic is subsequently performed by the communication PHY 116', as detailed above.

The model 210, for example, functions by analyzing changes relative to time, such as, trends and/or patterns, in the detected values, collected or otherwise obtained by the communication PHY 116', from within the operational time period, against a range of operational values (e.g., range of acceptable operational values), for the respective PHY parameter. The range of acceptable operational values is, for example, preprogrammed into the IVN 101, or computer by the processors 110 of the IVN 101, for one or more of the PHY parameters, and provided to the model 210. Alternately, the model 210 may establish the range of acceptable operational values for one or more of the PHY parameters.

The analysis, performed by the model 210, for example, determines that the cable and/or the PHY linked thereto may fail within a predetermined time period. The range of operational values is such that the operational values defining the acceptable operational range were obtained from one or more cables and/or PHYs linked thereto, of external and/or third party in-vehicle networks, and/or cables and/or PHYs linked thereto, including the instant cable and PHY linked thereto from which the determined values are collected and being analyzed, of the IVN 101 of the vehicle 100.

For example, the range of acceptable operational values for each of the PHY parameters is variable, and is based on the values for the PHY parameters being obtained continuously from the one or more cables and/or the PHY linked thereto, from different vehicles (e.g., different from the instant or given vehicle 100), and/or from the instant vehicle 100 (including the instant cable and/or PHY lined thereto from which the determined values are collected and/or other cables and PHYs linked thereto in the IVN 101 of the same vehicle 100). The obtained values are stored in memory of the IVN 101, for each of the PHY parameters.

Additionally, or alternately, the range of acceptable operational values for each of the PHY parameters is based, for example, fully or partly, on analyzing a history of the obtained values (e.g., stored in the memory of the IVN 101) for each of the PHY parameters from the one or more cables and/or the PHY linked thereto. By analyzing the history of the acceptable operational values for each of the PHY parameters, the ranges may be adjusted to accommodate the changes in acceptable performance values for the cable and/or PHY linked thereto, for each of the PHY parameters. The analysis performed by the model 210 may be in accordance with the range of acceptable operational values (e.g., the most current acceptable operational values) for the respective PHY parameter.

The analysis of the detected values, for example, by the model 210, against the range of acceptable operational values, may be performed on a single detected value or groups of detected values. For example, the groups of detected values may be two or more detected values or the entire amount of detected values collected over the operational time period. One group of detected values or multiple groups of detected values, along with individual detected values may be analyzed together.

For example, there may be a cloud of acceptable values, which in some scenarios, values that are near or even beyond the edge (limit) of a range of acceptable operative values, for a given individual value, may be compensated for by one or more other values in a dynamic manner. Accordingly, the entirety of nominal values along with changes in the values need to be considered.

Also, for example, in other scenarios, where although all values, when considered on an individual basis, may be within their respective individual tolerances (e.g., ranges of acceptable operational values), when considered as a whole, the collection (e.g., group) of values may be indicative of a cable and/or linked PHY defect or failure. Such indications may be based on detecting trends and patterns in the determined values of the group. The model 210, for example, determines whether the cable 118a, 118b and/or the PHY 116 linked thereto may fail by analyzing the determined values for one or more of the PHY parameters for the operational time period against the range of acceptable operational values. For example, the analysis may be based on the determined values trending and/or showing a pattern, toward moving outside of the range of acceptable operational values for the one or more of the PHY parameters. Accordingly, based on the aforementioned trend or pattern analysis, including extrapolation methods and regression analysis, a cable and/or PHY linked thereto, may be considered to be failing even though the determined values collected over the operational time period are within the range of acceptable operational values.

Alternately, the operational time period may be from one or more multiple continuous time periods, collected over multiple times, each of the multiple times when the vehicle is operating (running). Accordingly, this operational time period for example, may be on the order of hours, days, weeks, and even months.

The model 210 determines whether there may be a failure of the cable and/or PHY linked thereto, within a predetermined time period, for example, based on the analysis of the determined values, including trending and pattern analysis of the determined values over the operational time period, and/or probabilities set within the model 210 as thresholds for cable and/or PHY failures, for each of the PHY parameters.

For example, when probabilities are involved, the model 210 signals or otherwise indicates a possible failure of the cable and/or PHY linked thereto, when the probability is determined to be above a threshold probability. Conversely, the model 210 neither signals nor indicates a probability of failure of the cable and/or PHY linked thereto, when the probability of the failure is below the probability threshold.

For example, the model 210, may determine that the cable and/or PHY linked thereto may fail based on an analysis of the determined values for one of the PHY parameters for the operational time period being within and/or outside of the range of acceptable operational values, including, the determined values remaining within the range of acceptable operational values for the operational time period, but trending toward moving outside of the range of operational values, with the trend continuing outside of the range of acceptable values, for the one or more the PHY parameters.

Also, when one or more of the determined values falls outside of the range, and determined values collected subsequently in time remains outside of the range of acceptable operational values, the cable and/or PHY linked thereto is typically considered to have deteriorated to a point where a failure may occur.

Additionally, there may be mixed cases, where determined values move between inside and outside of the range. For example, the determined values collected over the operational time period start inside the range. The collected determined values subsequently move outside the range, and subsequently return inside of the range of acceptable operational values. This behavior, for example, may be indicative of a loose cable, which because of its loose connection, is initially in a sufficient contact (determined values inside the range), is brought out of contact (to an insufficient contact or no contact) by vehicle movement (determined values outside of the range), and the subsequent movement causes the contact to reestablish a sufficient contact (determined values inside the range). However, as this cable shows behavior of being loose, with values indicative of insufficient contact or a loss of contact, the model 210 may predict its failure within a predetermined time period.

The model 210, for example, may also be programed to weight the various PHY parameters, with some PHY parameters being better indicators of predicting cable failure than other PHY parameters. This also applies to combinations of certain PHY parameters.

Should the model 210 determine that there is a chance of a failure of the cable and/or the PHY linked thereto, the model 210 provides one or more indications to the system controller 110x to forecast a possible failure. The system controller 110x is programmed to act on this indication, alone, or with other indications associated with other PHY parameters, that the cable and/or the PHY linked thereto may fail within the predetermined time period, to provide indications to the IVN 101, vehicle operator, or party associated with the vehicle operator of a future failure of the cable and/or the PHY linked thereto. For example, the system controller 110x may be programmed to provide an indication of failure of the cable and/or the PHY linked thereto when cable and/or PHY failure is indicated for one PHY parameter, or a certain one PHY parameter, associated with the cable and/or the PHY linked thereto. Alternately, the system controller 110x may be programmed to provide an indication of failure of the cable and/or the PHY linked thereto when cable and/or PHY failure is indicated for two or more PHY parameters associated with the cable and/or the PHY linked thereto, and in some cases, two or more of certain PHY parameters.

The indication of failure of the cable and/or the PHY linked thereto, is issued, for example, by the system controller 110x. The indication includes, for example, one or more of: logging the identified possible failure of the cable and/or PHY linked thereto, issuing an alert, notifying the driver or other user associated with the given vehicle. The issuing of the aforementioned indication and/or the indication itself, may result in the system controller 110x taking remedial action, such as switching to a backup cable, or stopping the vehicle 100.

As values for the cable 118a, 118b and/or PHY linked thereto are, for example, continuously being obtained for the respective PHY parameters, and may also be from other cables and/or PHYS linked thereto in the IVN 101 and/or the IVN of another of different vehicle, the ranges of acceptable operational values may change over time. For example, the continuously obtained values may be analyzed with previously stored values and previously stored ranges of acceptable operational values, in order to change the span of the range, or set a new range of acceptable operational values, which the model uses in its analysis. Alternately, as the range of acceptable operational values may be subject to continuous and even instantaneous change, the model 210, may use the most recent or current range of acceptable operational values, for example, the most recently determined range of acceptable operational values, in its analysis, of the determined values for the respective PHY parameter.

For example, the collection rate for determined values, corresponding to data, signals, and/or echoes received from the cable and/or PHY linked thereto, may be adaptive in the sense that when it the value(s) is/are detected, a cable is trending towards deterioration. The system controller 110x may be programmed to cause collection of detected values indicative of a failing cable and/or PHY linked thereto, for certain one or more PHY parameters, at a greater frequency, than is typical. Some reasons for not always collecting at the greater rate are 1) increased complexity; 2) increased resource requirements for collecting, storing and processing that additional data; and 3) increased power consumption for collecting, storing and processing the additional data. Conversely, adaptivity supports in most cases, reduced in complexity, reduced resource requirements and reduced power. Reduced power is significant from an ESG (environment/sustainability/governance) standpoint.

Figure 3:
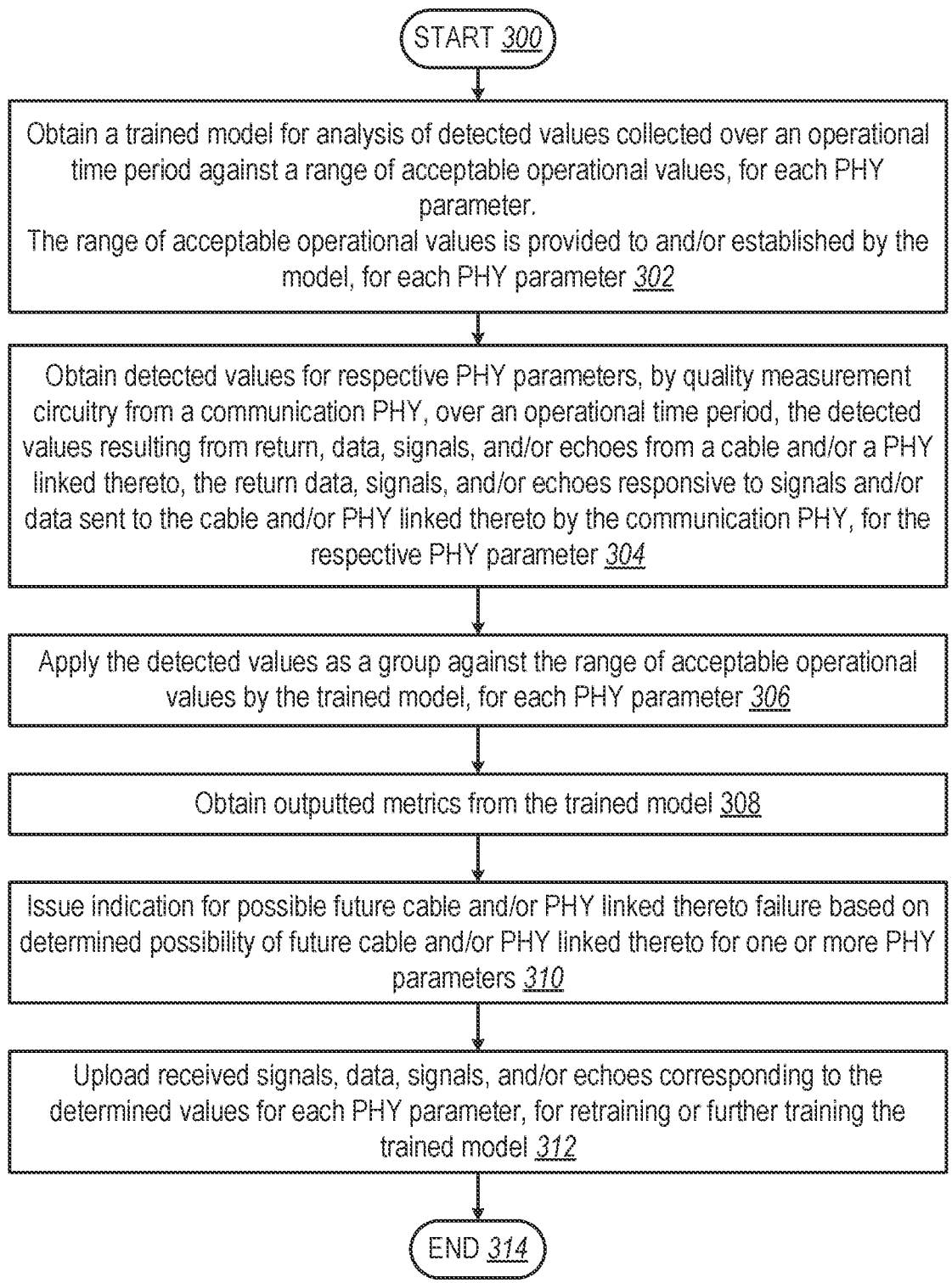
FIG. 3 is a flow diagram of an example process performed by the system of FIGS. 2A and 2B, in accordance with an embodiment described herein.

An example process performed by the system 200 is shown in FIG. 3, to which attention is now directed.

In FIG. 3, the process starts at block 300. At this START, in an embodiment, the PHY 116, formed of a communication PHY 116' and a quality measurement circuitry 117, of the IVN 101, is in diagnosis or testing mode, ready to perform cable and/or PHY diagnosis and/or testing, once the vehicle is operating. The process moves to block 302, where a model 210, for example, a computer trained model, for analysis of detected values collected over an operational time period against a range of operational values, for example, a range of acceptable operational values, as determined by the system 200 in accordance with system-determined standards and/or criteria, for one or more PHY parameters, is obtained. The model 210, for example, is either provided and/or establishes, a range of acceptable operational values, for the cable 118a, 118b and/or PHY 116 linked thereto, for each PHY parameter, as detailed above.

The model 210 identifies the determined values with a PHY parameter and groups the obtained (determined) values into groups based on the corresponding PHY parameter. The model 210 evaluates each group of determined values to determine whether there is a possibility of failure of the cable and/or the PHY linked thereto, within a predetermined time period.

For example, the model 210 may be a rules-based model or an Artificial Intelligence (AI) model, including a machine learning (ML) model. The AI model may also be, for example, a neural network model. In the case of the AI model, this is typically achieved by the quality measurement circuitry 117 downloading the trained AI model, from locations along a network, and/or the cloud. A ML model is such that it is trained with cable and/or PHY data obtained from different vehicles, or previous instances of the given vehicle, which relate to IVN operation, without explicit programming.

The process moves to block 304 where the detected values, from the cable and/or the PHY linked thereto, collected by the communication PHY 116', over an operational time period, are obtained by the quality measurement circuitry 117. The detected values result from return data, signals, and/or echoes, from a cable and/or the PHY linked thereto, where the aforementioned return data, signals, and/or echoes are responsive to signals and/or data transmitted by the communications PHY 116', for the respective PHY parameter.

Moving to block 306, the detected values are grouped by PHY parameter, with each group of detected values applied by the trained model, against a range of operational values (e.g., range of acceptable operational values), for the respective PHY parameter. For example, as the detected values are obtained over the operative time period, the model, for example, evaluates trending, patterns and movements in the values of the group over time.

At block 308, the trained model has analyzed the group of detected values against the range of acceptable operative values, for the respective PHY parameter, and outputs metrics. At block 310, based on the outputted metrics, the system controller 110x issues an indication for possible future failure of the cable and/or the PHY linked thereto, based on model-determined possibilities of future cable and/or the PHY linked thereto failure, for one or more PHY parameters. The indication of failure of the cable and/or the PHY linked thereto, is issued, for example, by the system controller 110x. The indication includes, for example, one or more of: logging the identified possible failure of the cable and/or PHY linked thereto, issuing an alert, notifying the driver or other user associated with the given vehicle. The determination to issue an indication of failure, and/or the indication of failure itself, of the cable and/or the PHY linked thereto, may also cause the system 200 to take remedial action, such as switching to a backup cable, stopping the vehicle 100.

The process then moves to block 312, where the received signals, data and/or echoes, corresponding to the detected values for each PHY parameter is optionally uploaded to a database associated with the quality measurement circuitry 117, in order to retrain or provide future training of the trained model. The process ends at block 314, and may be repeated for as long as desired.

Figure 4:
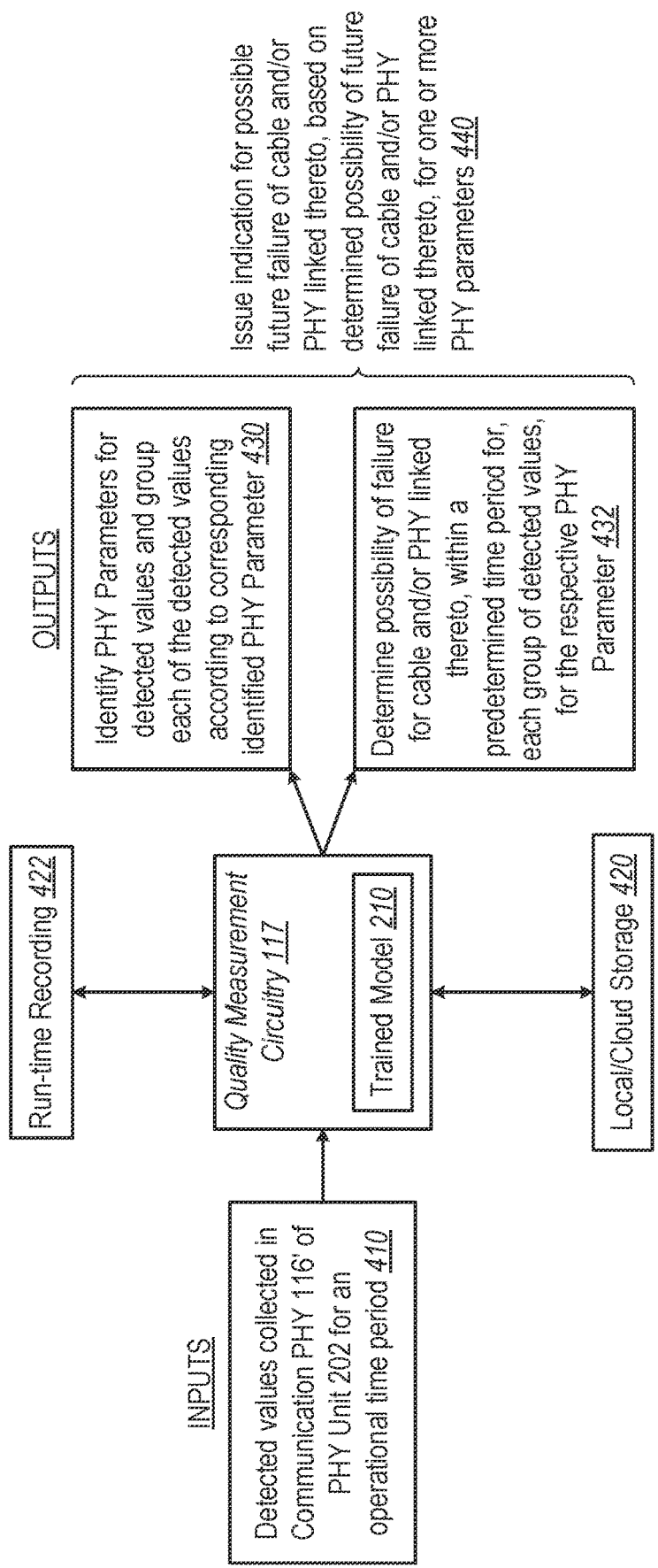
FIG. 4 is a block diagram that schematically illustrates architecture of a system for identifying cable degradation and/or cable defects in the network of FIG. 1, in accordance with an embodiment that is described herein.

FIG. 4 is an architectural block diagram of a trained model 210, such as an Artificial Intelligence (AI) model, or a machine learning (ML) model, which are downloaded into the quality measurement circuitry 117, in accordance with embodiments of the disclosure. The trained model 210 (e.g., computer trained model) receives inputs, detected values corresponding to return data, signals, and/or echoes, from the cable 118a, 118b and/or the PHY 116 linked thereto, which have been collected, for example, over and operational time period 410.

In an embodiment, the trained model 210 (e.g., computer trained model) is downloaded from remote locations over external networks, such as the Internet, and portions thereof may be stored in the cloud 420. There is also an associated module for run-time recording 422. The trained model 210, running on the quality measurement circuitry 117, outputs a set of metrics in response to input information, i.e., determined values corresponding to signals, data, and or echoes, returned from the cable and/or PHY linked thereto, in response to signals and or data sent by the communication PHY 116', as controlled, for example, by the system controller 110x.

The set of metrics includes, for example, the identified the PHY parameter corresponding to each detected value, and groups for the detected values based on the identified PHY parameter 430, and, determinations of possible failure of the cable and/or the PHY linked thereto within a predetermined time period, for each group of detected vales (e.g., the group of values having been collected over the operational time period), for the respective PHY parameter 232.

The results of these metrics are analyzed, for example, by the system controller 110x or the processor 110, to determine whether to issue an indication of a possible future failure of the cable and/or PHY linked thereto, based on the determined possibility of future failure of the cable and/or the PHY linked thereto for one or more of the PHY Parameters 440. The indication of failure of the cable and/or the PHY linked thereto, includes, for example, one or more of: logging the identified possible failure of the cable and/or PHY linked thereto, issuing an alert, notifying the driver or other user associated with the given vehicle. The determination to issue an indication of failure, and/or the indication of failure itself, of the cable and/or the PHY linked thereto, may also cause the system 200 to take remedial action, such as switching to a backup cable, stopping the vehicle 100.

The number of PHY parameters, for which a failure of cable and/or PHY linked thereto, is indicative, for which to issue an indication of a future failure of a cable and/or PHY linked thereto, is, for example, programmed into the system controller 110x and/or the processor 110. The weighting of each PHY parameter may also be used in determining whether to issue an indication of a possible failure of the cable and/or the PHY linked thereto.

Figure 5A:
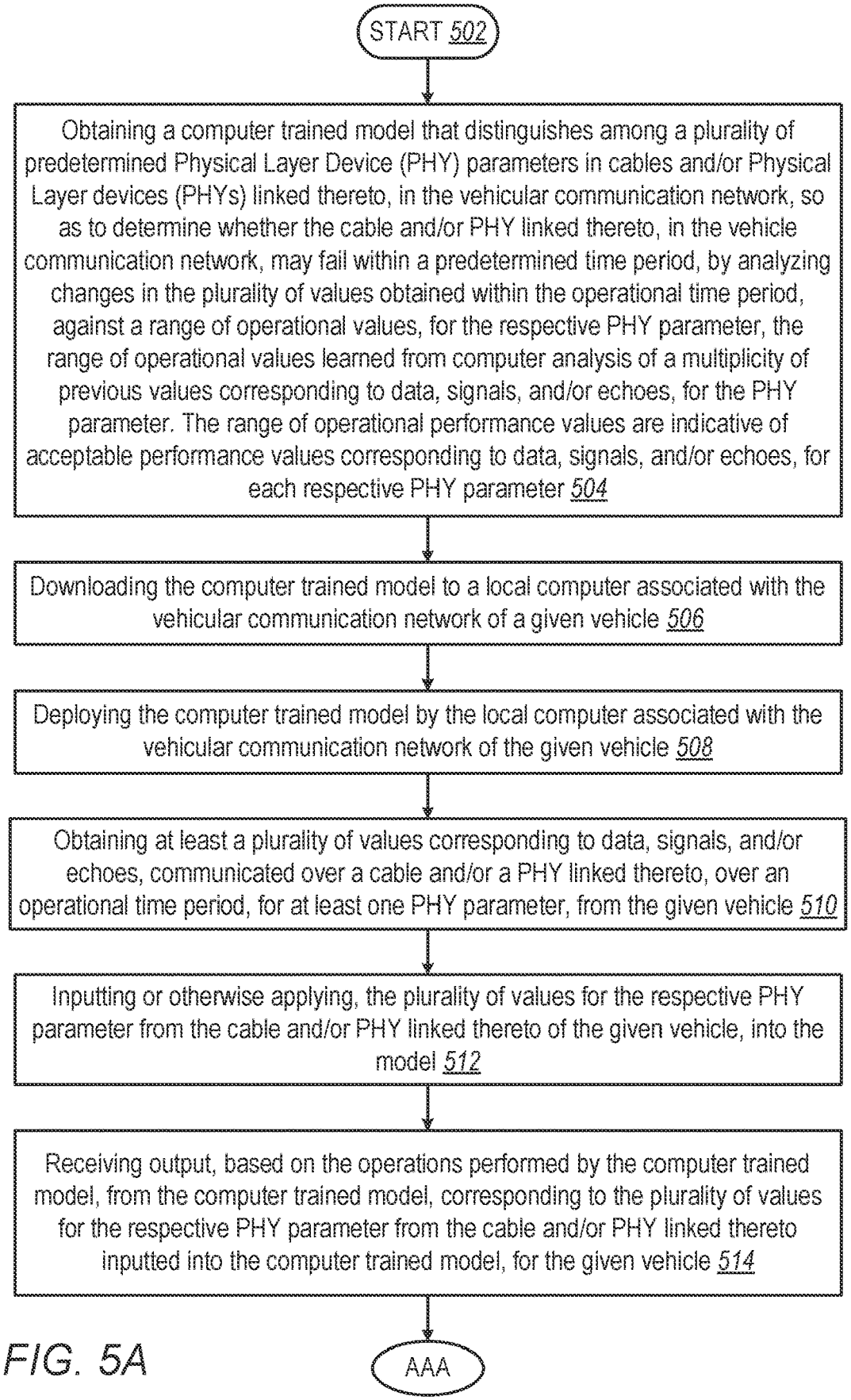
FIGS. 5A and 5B are a diagram of a process performed by the system of FIG. 2.
Figure 5B:
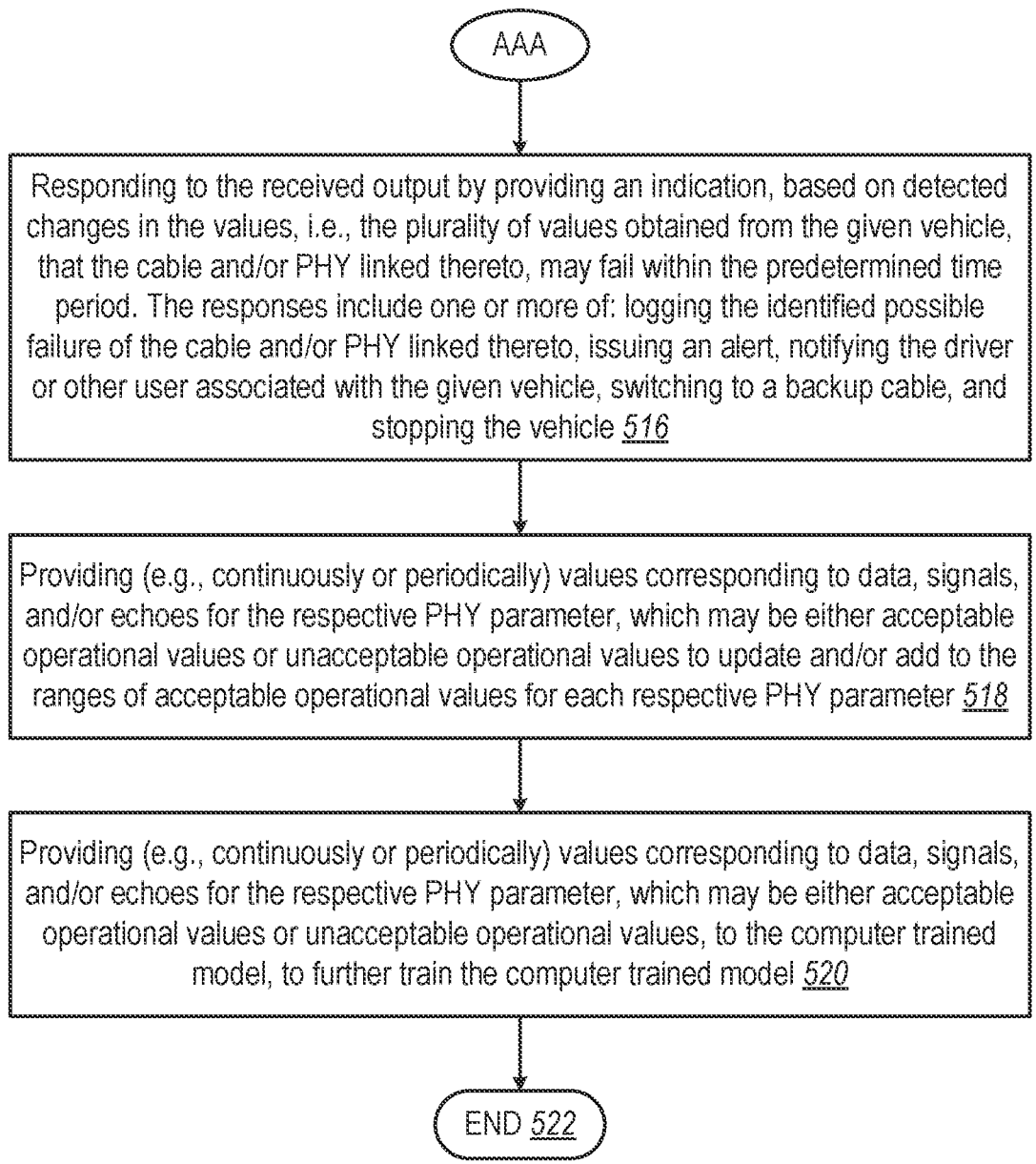

Attention is now directed to FIGS. 5A and 5B which show a flow diagram detailing a computer-implemented process in accordance with embodiments of the disclosed subject matter. The aforementioned process, which includes subprocesses, is performed, for example, automatically and/or in real time.

The process begins at a START block 502, where the processor 209 of the quality measurement circuitry 117, in a vehicle 100, i.e., a given vehicle, is activated.

The process moves to block 504, where the local processor 209 of the quality measurement circuitry 117 obtains a trained computer model 210. The model 210 has been trained based on values corresponding to data, signals, and/or echoes collected or otherwise obtained from cables and PHYs linked thereto, from different vehicles, with additional training values coming from the cables and/or PHYs linked thereto from the given vehicle, with the collected values being for one or more PHY parameters. The collected values are trained into the model 210, for example, by being indicative of an acceptable operational value or an unacceptable operational value.

The model 210 is such that it distinguishes among a plurality of predetermined Physical Layer (PHY) parameters in cables and/or Physical Layer devices (PHYs) linked thereto, in the vehicular communication network, so as to determine whether the cable and/or PHY linked thereto, in the vehicle communication network, may fail within a predetermined time period, by analyzing changes in the plurality of values obtained within the operational time period, against a range of operational values, for the respective PHY parameter, the range of operational values learned from computer analysis of a multiplicity of previous values corresponding to data, signals, and/or echoes, for the PHY parameter. The ranges are indicative of acceptable performance values of the cable and/or PHY linked thereto. The ranges, for example, include the recently (presently or currently), e.g., most recently, determined acceptable (performance) values, and thus, the recently (presently or currently), e.g., most recently determined range of acceptable performance values, for each of the respective PHY parameters, the values corresponding to data, signals, and/or echoes, for each respective PHY parameter.

For example, the multiplicity of previous values is obtained from cables and/or PHYs linked thereto from: 1) one or more vehicles different from the given vehicle, and/or 2) the given vehicle.

The model is, for example, at least one least one of a rules-based model, Artificial Intelligence (AI) model and a machine learning (ML) model. As an additional example, the AI or ML model may includes a trained neural network.

The process moves to block 506, where the computer trained model is downloaded to a local computer associated, i.e., the cable quality measurement circuitry 117, of the vehicular communication network 101 of a given vehicle, i.e., the vehicle 100.

At block 508, the computer trained model is deployed by the local computer, i.e., the processor 209 of the cable quality measurement circuitry 117, associated with the vehicular communication network 101 of the given vehicle 100.

Moving to block 510, the cable quality measurement circuitry 117 obtains at least a plurality of values corresponding to data, signals, and/or echoes communicated over a cable and/or a PHY linked thereto, over an operational time period, for at least one PHY parameter, from the given vehicle.

At block 512, the plurality of values for the respective PHY parameter from the cable and/or PHY linked thereto, the plurality of values known as determined values (which were obtained during the operational time period) from the given vehicle 100, are inputted or otherwise applied to the model 210.

Moving to block 514, output from the model is received. This output is based on, for example, the operations performed by the computer trained model 210 on the inputted determined values, for the respective PHY parameter, for the given vehicle 100.

At block 516, the system controller 110x and the processors/computers 110 of the IVN 100 for the given vehicle 100 respond to the received output by providing an indication, based on detected changes in the values (the values, for example, being the plurality of values which were obtained during the operational time period), that the cable and/or the PHY linked thereto may fail within the predetermined time period. The system 200 responses to the indication, for example, include one or more of: logging the identified possible failure of the cable and/or PHY linked thereto, issuing an alert, notifying the driver or other user associated with the given vehicle, and switching to a backup cable, shutting down and/or stopping the vehicle, and the like.

The process moves to block 518, where values corresponding to data, signals, and/or echoes, for the respective PHY parameter, which may be either acceptable operational values or unacceptable operational values, are provided, for example, continuously or periodically, to update and/or add to the ranges of acceptable operational values for each respective PHY parameter. At block 520, values corresponding to data, signals, and/or echoes, for the respective PHY parameter, which may be either acceptable operational values or unacceptable operational values, are provided, for example, continuously or periodically, to the computer trained model 210, to further train the computer trained model 210.

The process moves to block 522 where it ends. The process may be repeated for as long as desired, for example, for each PHY parameter, based on a sufficient amount of determined values obtained over an operational time period.

EXAMPLES

The following Examples are provided to show groups of detected values, collected over an operational time period, from a given vehicle, for example, during operation thereof. The groups of values are analyzed for trends and patterns, in order to forecast cable and/or the PHY linked thereto deterioration. The deterioration may indicate the possibility of failure of the cable and/or the PHY linked thereto, within a predetermined time period.

Example 1—Return Echo Signals

Mechanical stress on the cable may give rise to a new reflection point. Over time, the bending may cause cable discontinuities. In one case, for the PHY parameter echo location (e.g., reflection point) in the cable, the reflection point may move or have varied locations in the cable, outside of an acceptable range of locations in the cable. With reflection points falling, trending to fall, or showing a pattern to fall, outside of the acceptable range, the cable is considered to be deteriorated and may be failing, within a predetermined future time period.

In another case, the energy of the echo is measured over an operative time period. If the determined values for the energy of the echo is outside of the range of operative values for this PHY parameter, or fluctuate between being within and being outside of the range, the cable is considered to be deteriorated and may be failing, within a predetermined future time period.

Example 2A—Deterioration of Signal Quality—Signal to Noise Ratio (SNR)

Cable deterioration eventually reduces SNR.

Errors are occurring in different parts of a data path, with determined values for these errors falling outside of the range of operative values for SNR. The cable is now considered to be deteriorating, and may be failing, within a predetermined future time period.

For example, a link (cable 118, 118b connected to a PHY 116) that its SNR in the first year of usage is 30 dB. Also, it may be assumed that that cable is going to see errors only when SNR drops to 20 dB. Over the time, the SNR starts to decrease. Also during this time, the average SNR in diagnostic tests could be normal and close to 30 dB. However, during an operational time period, when the vehicle 100 is in operation and moving on a road, occasionally the minimum SNR, as a determined value, may hit a new low. Next, assuming that for the second year of link in use, the minimum SNR is 27, for the third year of link in use, the minimum SNR is 24, and, for the fourth year of link in use, the minimum SNR is 21. In this case, a linear regression indicates that minimum SNR in the fifth year will be 18 dB, and thus link can see errors in communication. Based on this prediction, the quality measurement circuitry 117 will inform the host and automobile control that this cable is failing, and it should be replaced.

Example 2B—Deterioration of Signal Quality—Electromagnetic Interference (EMI)

A damaged cable shield can expose the inner cable to increased EMI, which may be elevated when compared to the properly shielded cable. The EMI causes SNR deterioration, such that errors are occurring in different parts of a data path along a physical link, with determined values for these errors falling outside of the range of operative values for SNR. Additionally, trends among various determined values of a group of determined values for SNR, such as SNR values following a certain trajectory may be indicative of cable deterioration. As such, the cable may be failing, within a predetermined future time period.

Example 3—Received Signal Power Variation

Mechanical stress, such as tension, on the cable may change the resistance along the length of the cable thereby resulting in changes to insertion loss. The change in insertion loss may be detected by monitoring the determined values for the PHY parameter received signal power, and analyzing the determined values against a range of operative values. A decrease in power, indicated by determined values in received signal power falling below a power threshold may be indicative of a damaged and/or deteriorated cable, that is failing, or has a probability of failing within a predetermined future time period.

Although the embodiments described herein mainly address automotive applications (e.g., cars and trucks), the methods and systems described herein can also be used in other sorts of vehicular networks, such as in aircraft and boats.

It is noted that the embodiments described above are cited by way of example, and that the present disclosure is not limited to what has been particularly shown and described hereinabove. Rather, the scope of the present disclosure includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for detecting failure in cables and/or physical layer devices (PHY) linked thereto, of a communications network in a vehicle, the method comprising:

obtaining values for one or more physical layer device (PHY) parameters from one or more cables and/or a PHY linked thereto, of a communications network of a vehicle;

analyzing the obtained values to determine a range of operational values for each of the one or more PHY parameters,
the operational values comprising, for each of the one or more PHY parameters, predetermined acceptable values for performance of a cable and/or a PHY linked thereto, and
the range of operational values, for each of the PHY parameters, being based on analyzing a history of the obtained values for each of the PHY parameters from the one or more cables and/or the PHY linked thereto;

detecting values for the one or more of the PHY parameters from the cable and/or the PHY linked thereto of a communications network of a vehicle during an operational time period when the vehicle is operating;

applying, to the detected values, a computer trained model that analyzes changes in the detected values within the operational time period against the range of operational values, for the respective PHY parameter, to determine that the cable and/or the PHY linked thereto may fail within a predetermined time period; and providing an indication, based on detected changes in the values, that the cable and/or the PHY linked thereto may fail within the predetermined time period.

2. The method of claim 1, wherein the range of operational values for each of the PHY parameters is variable, and is based on the values for the PHY parameters being obtained continuously from the one or more cables and/or the PHY linked thereto.

3. The method of claim 1, wherein the computer model analyzes the obtained values to determine the range of operational values for each of the one or more PHY parameters.

4. The method of claim 1, wherein the PHY parameters include one or more of: return echo signal, signal to noise ratio (SNR), insertion loss, electromagnetic interference, signal power, signal amplitude, signal magnitude, signal frequency, signal phase, signal duration, signal shape, signal polarization, signal modulation, signal level, signal irradiance, clocking, signal power spectrum density, PHY power voltage, PHY current level, PHY temperature, cable noise, cable, cable power transmission, and increased or new echo locations in the cable.

5. The method of claim 1, wherein the one or more physical layer device (PHY) parameters from one or more cables and/or PHYs linked thereto includes a plurality of PHY parameters, and, the providing the indication that the cable and/or PHY linked thereto may fail is based on the detected values for at least a plurality of the PHY parameters being indicative that the cable and/or PHY linked thereto is failing.

6. The method of claim 1, wherein the determining that the cable and/or the PHY linked thereto may fail includes the determined values for at least one of the PHY parameters for the operational time period being within the range of operational values and trending toward moving outside of the range of operational values for the one of the PHY parameters.

7. The method of claim 1, wherein the determining that the cable and/or the PHY linked thereto may fail includes the determined values for at least one of the PHY parameters for the operational time period being within and/or outside of the range of operational values, including, trending toward moving outside of the range of operational values, for the one of the PHY parameters.

8. The method of claim 1, wherein the computer trained model comprises a rules-based model.

9. The method of claim 1, wherein the computer trained model comprises an Artificial Intelligence (AI) model or a machine learning (ML) model.

10. The method of claim 9, wherein the AI or ML model is trained to:
   identify the detected values in accordance with a corresponding PHY parameter from amongst the one or more PHY parameters; and
   distinguish among a plurality of predetermined Physical Layer (PHY) parameters in cables and/or Physical Layer devices (PHYs) linked thereto, in the vehicular communication network, so as to determine whether the cable and/or PHY linked thereto, in the vehicle communication network, may fail within a predetermined time period, by analyzing changes in the detected values, against a range of operational values, for the respective PHY parameter, the range of operational values learned from computer analysis of a multiplicity of previous values corresponding to data, signals, and/or echoes, for the PHY parameter.

11. The method of claim 9, wherein the AI or ML model is trained to determine whether a plurality of determined values obtained in the operative time period indicates a probability of failure in a predetermined time, of the cable and/or the PHY linked thereto.

12. The method of claim 1, wherein the computer trained model additionally analyzes the detected values from within the operational time period, and determines whether certain of the one or more PHY parameters are to be determined within another operational time period of a predetermined length.

13. The method of claim 9, wherein the AI or ML model includes a neural network model.

14. The method of claim 1, wherein the obtaining values for one or more PHY parameters from the one or more cables and/or the PHY linked thereto, includes obtaining the values from the one or more cables and/or the PHY linked thereto of the vehicle and/or one or more different vehicles.

15. The method of claim 1, wherein the range of acceptable operational values includes the most recently determined range of acceptable operational values.

16. A system for determining failures of cables and/or physical layer devices (PHYS) linked thereto of a vehicular communication network, the failure determination system comprising:
   one or more processors; and,
   a program memory storing executable instructions that, when executed by the one or more processors, cause the system to:
      obtain a plurality of values corresponding to data, signals, and/or echoes for a physical layer device (PHY) parameter, the values of the plurality of values corresponding to data, signals, and/or echoes received from a cable and/or PHY linked thereto, of a vehicle communication network of a given vehicle;
      apply, to the at least the plurality of values, a computer trained model that distinguishes among a plurality of predetermined Physical Layer (PHY) parameters in cables and/or Physical Layer devices (PHYs) linked thereto, in the vehicular communication network, so as to determine whether the cable and/or PHY linked thereto, in the vehicle communication network, may fail within a predetermined time period, by analyzing changes in the plurality of values obtained within the operational time period, against a range of operational values, for the respective PHY parameter, the range of operational values learned from computer analysis of a multiplicity of previous values corresponding to data, signals, and/or echoes, for the PHY parameter,
      the operational values comprising, for each of the one or more PHY parameters, predetermined acceptable values for performance of a cable and/or a PHY linked thereto, and
      the range of operational values, for each of the PHY parameters, being based on analyzing a history of the obtained values for each of the PHY parameters from the one or more cables and/or the PHY linked thereto; and
      provide an indication, based on detected changes in the values, that the cable and/or the PHY linked thereto may fail within the predetermined time period.

17. The system for determining failures of cables and/or physical layer devices (PHYs) linked thereto of claim 16, wherein the multiplicity of previous values is obtained from cables and/or PHYs linked thereto from: 1) one or ore vehicles different from the given vehicle, and/or 2) the given vehicle.

18. The system for determining failures of cables and/or physical layer devices (PHYS) linked thereto of claim 16, wherein the acceptable values are the values most recently determined to be acceptable for performance of a cable and/or a PHY linked thereto, for the PHY parameter.

19. The system for determining failures of cables and/or physical layer devices (PHYs) linked thereto of claim 16, wherein the computer trained model is stored in the program memory and comprises at least one of a rules-based model, Artificial Intelligence (AI) model and a machine learning (ML) model.

20. The system for determining failures of cables and/or physical layer devices (PHYs) linked thereto of claim 19, wherein the AI or ML model includes a trained neural network.

21. The system for determining failures of cables and/or physical layer devices (PHYs) linked thereto of claim 16, wherein the PHY parameters include one or more of: return echo signal, signal to noise ratio (SNR), insertion loss, electromagnetic interference, signal power, signal amplitude, signal magnitude, signal frequency, signal phase, signal duration, signal shape, signal polarization, signal modulation, signal level, signal irradiance, clocking, spectrum density, PHY power voltage, PHY current level, PHY temperature, cable noise, cable, cable power transmission, and increased or new echo locations in the cable.

22. The system for determining failures of cables and/or physical layer devices (PHYs) linked thereto of claim 16, additionally comprising: responding to the indication includes one or more of: logging the identified possible failure of the cable and/or PHY linked thereto, issuing an alert, notifying the driver or other user associated with the given vehicle, switching to a backup cable, and stopping the vehicle.

* * * * *